(12) United States Patent
Xue et al.

(10) Patent No.: US 7,386,767 B1
(45) Date of Patent: Jun. 10, 2008

(54) PROGRAMMABLE BIT ERROR RATE MONITOR FOR SERIAL INTERFACE

(75) Inventors: Ning Xue, Fremont, CA (US); Chong H Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 625 days.

(21) Appl. No.: 10/958,447

(22) Filed: Oct. 5, 2004

(51) Int. Cl.
*G06F 11/00* (2006.01)

(52) U.S. Cl. .................. 714/704; 714/705; 714/706; 714/707; 714/712; 714/715; 714/716; 714/725; 714/48

(58) Field of Classification Search .................. 714/704
See application file for complete search history.

(56) References Cited

U.S. PATENT DOCUMENTS

| | | | | |
|---|---|---|---|---|
| 4,447,902 A | * | 5/1984 | Wilkinson | 714/755 |
| 4,451,916 A | * | 5/1984 | Casper et al. | 714/4 |
| 5,325,397 A | * | 6/1994 | Scholz et al. | 375/224 |
| 5,606,563 A | * | 2/1997 | Dorbolo et al. | 714/704 |
| 5,623,497 A | * | 4/1997 | Shimawaki et al. | 714/704 |
| 5,764,651 A | * | 6/1998 | Bullock et al. | 714/708 |
| 6,973,600 B2 | * | 12/2005 | Lau et al. | 714/704 |
| 6,988,227 B1 | * | 1/2006 | Perrott | 714/704 |
| 7,194,666 B1 | * | 3/2007 | Wong et al. | 714/704 |
| 7,231,558 B2 | * | 6/2007 | Gentieu et al. | 714/704 |
| 7,234,086 B1 | * | 6/2007 | de Koos et al. | 714/704 |
| 2004/0083077 A1 | * | 4/2004 | Baumer et al. | 702/185 |
| 2006/0020412 A1 | * | 1/2006 | Bruensteiner | 702/117 |
| 2006/0069971 A1 | * | 3/2006 | Waschura et al. | 714/724 |

* cited by examiner

*Primary Examiner*—John P Trimmings
(74) *Attorney, Agent, or Firm*—Ropes & Gray LLP; Jeffrey H. Ingerman

(57) ABSTRACT

A programmable bit error rate monitor includes an error counter, a monitoring period counter with a programmable upper bound to set the monitoring period, and an error flag generator that compares the actual error count to a programmable threshold. The error flag generator may generate flags at different sensitivity levels, and the user may programmably select one of those flags. The three flags can be generated by independent comparators, or they can be extrapolated from the base error flag—e.g., by comparing only certain bits of the error count to corresponding bits of the threshold.

13 Claims, 4 Drawing Sheets

PROGRAMMABLE BIT ERROR RATE MONITOR FOR SERIAL INTERFACE

BACKGROUND OF THE INVENTION

This invention relates to a bit error rate monitor for a serial communication interface. More particularly, this invention relates to a bit error rate monitor that is programmable to allow adjustment by a user to accommodate different interfaces.

Monitoring the bit error rate is important in serial communications applications. For example, the telecommunications industry closely monitors bit error rates. At various thresholds of bit error rate, a communications device may be instructed to slow down its transmission rate (and to return to its full rate when the error rate decreases), to request maintenance, to shut down or enter an idle mode, and/or to activate an alternate or back-up device.

Different communications devices have different error threshold requirements (i.e., different monitoring period and threshold levels). For example, the 10-Gigabit Ethernet 64b/66b padded protocol specification calls for monitoring two bits out of every 66 bits, and sets an error threshold of $10^{-4}$ (one bit error in ten thousand bits), while most telecommunications applications have a base error threshold of $10^{-3}$ (one bit error in one thousand bits) during a 125 µs period (after which the total bit counter and the error counter are reset). At 10 Gb/s, each bit period is 0.1 ns, so that 125 µs, which is 125,000 ns, translates to 1,250,000 bits. Thus the base bit error rate (one error per 1,000 bits) for telecommunications applications at 10 Gb/s is 1,250 errors in 1,250,000 bits, or 12.5 errors in 12,500 bits. Such applications also frequently report errors at additional thresholds of $10^{-6}$ (one error per 1,000,000 bits) and $10^{-9}$ (one error per 1,000,000,000 bits). It should be noted that, as is commonly the case in digital systems, these thresholds are actually multiples of $2^{-10}$ (one-per-1,024) rather than multiples of $10^{-3}$ (one-per-1,000), so that one-per-million threshold is actually $2^{-20}$ (or one-per-1,048,576) and the one-per-billion threshold is actually $2^{-30}$ (or one-per-1,073,741,824).

Bit error rate monitors exist for such applications and protocols. However, unlike in standard telecommunications applications, in data communications applications the user may define his or her own threshold value and/or base measurement period. Moreover, when users implement designs in programmable logic devices, those designs may deviate from standard clock rates—even when implementing known standards—in order to meet requirements of a particular implementation. In such a case, the standard bit error monitors may not be appropriate. For example, instead of using the 10 Gb/s standard described above, a user may implement an 11 Gb/s data rate. At 11 Gb/s, a $10^{-3}$ bit error threshold would translate to 13.75 bit errors per 13,750 bits instead of 12.5 errors per 12,500 bits, with similar adjustments for $10^{-6}$ and $10^{-9}$ thresholds. In such a case, the standard bit error monitors may not be appropriate.

SUMMARY OF THE INVENTION

The present invention provides a programmable bit error rate monitor. Although, as discussed above, one motivation for provision of a programmable error rate monitor is that users may implement "standard" interfaces in programmable logic devices ("PLDs") in non-standard ways, so that different monitoring parameters may be necessary, preferably the programmable bit error rate monitor of the invention is provided separately from the programmable logic device on which the interface to be monitored is implemented. This is because the interface to be monitored normally would alter the data stream before it could be sent to the monitor. However, it may be possible to implement the programmable bit error rate monitor of the invention in the programmable logic core of the same PLD that includes the interface to be monitored. Alternatively, the programmable bit error rate monitor can be provided on a separate PLD. Either way, the programming to create the programmable bit error rate monitor may be provided as a preprogrammed "core" by the PLD supplier. In addition, the programmable bit error rate monitor can be provided as a discrete device with user-addressable memory into which the user could store the programmable parameters.

The programmable bit error rate monitor of the invention preferably includes a bit error counter that preferably monitors the data stream, and a monitoring period counter with a user-programmable upper bound. The bit error counter preferably outputs a signal to an error flag generator each time a bit error is detected. The monitoring period counter preferably outputs a reset signal when the upper bound, which defines the monitoring period, is reached.

The error flag generator preferably includes a programmable threshold register and a register for accumulating the bit error counts. Upon receipt of the reset signal from the monitoring period counter, the bit error generator preferably compares the bit error count to the programmed threshold stored in the threshold register, and generates at least one error flag when the bit error count exceeds the threshold. In one preferred embodiment, the error flag generator preferably generates three error flags, representing the three thresholds ($10^{-3}$, $10^{-6}$ and $10^{-9}$) discussed above. In such an embodiment, preferably a multiplexer is provided to allow a user to programmably select which error flag is output by the bit error rate monitor.

It would be expected that a user would program the monitoring period counter and the error threshold of the error flag generator so that an error flag is generated when an error rate that the user's application cannot tolerate is reached. Moreover, the user would be expected to select the sensitivity (e.g., $10^{-3}$, $10^{-6}$ and $10^{-9}$) required by the user's application. Normally, one would expect the user to monitor the highest sensitivity, changing to a lower sensitivity only on occurrence of an error flag, to see just how bad the error condition is.

Thus, a user might monitor only the $10^{-9}$ flag under normal conditions, and as long as that flag is not asserted, everything is normal. If the $10^{-9}$ flag is asserted, however, it means there is more than one error per billion bits, but that could include a situation where there is more than one error per million bits, which might require throughput reduction or tighter flow control, and even more than one error per thousand bits, which might require a system shutdown. So in a case where the $10^{-9}$ is asserted, the user might then switch to the $10^{-6}$ flag. If the $10^{-6}$ flag is not asserted, then the user knows that the noise level is still acceptable. If the $10^{-6}$ also is asserted, then the user might switch to the $10^{-3}$ flag. If the $10^{-3}$ flag is asserted, drastic action such as shutdown may be required, but if the $10^{-3}$ is not asserted, then the user knows that the condition is in the $10^{-6}$ range, and can take less drastic action.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-5.

Figure 1:
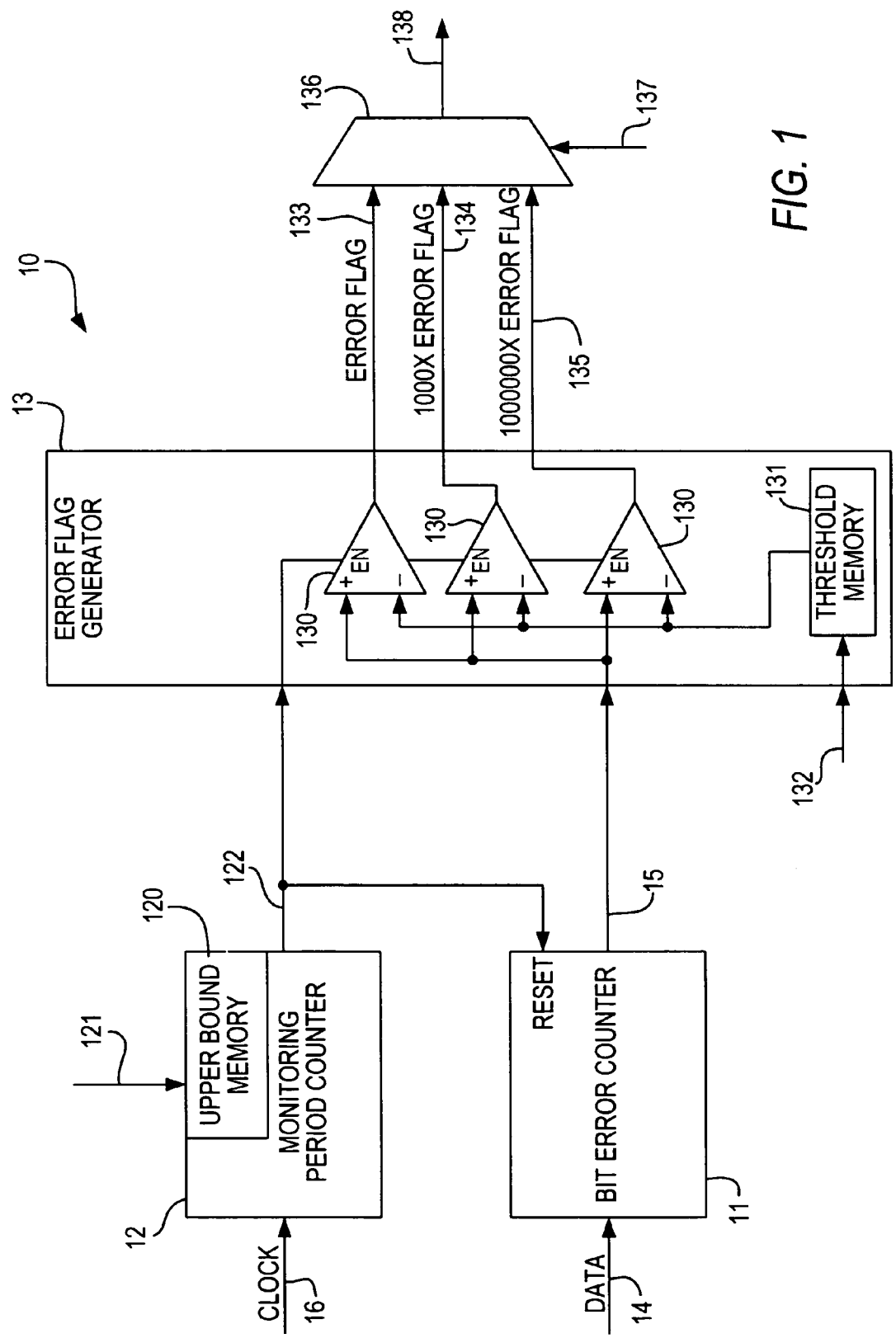
FIG. 1 is a schematic diagram of a preferred embodiment of a programmable bit error rate monitor in accordance with the present invention.

As shown in FIG. 1, a preferred embodiment of a programmable bit error rate monitor 10 in accordance with the present invention preferably includes at least a bit error counter 11, a programmable monitoring period counter 12, and an error flag generator 13. Bit error counter 11 preferably receives the data stream 14 to be monitored, and outputs at 15 a signal representative of the number of errors encountered since the last reset of bit error counter 11.

A clock signal 16 associated with data signal 14, which may be provided separately from data signal 14 or may be recovered from data signal 14 by clock recovery circuitry (not shown) as is well known, is input to programmable monitoring period counter 12. Programmable monitoring period counter 12 preferably includes a user-programmable memory 120 into which a user, via input 121, can enter an upper bound representing the duration of the monitoring period. Programmable monitoring period counter 12 preferably increments once per cycle of clock 11. When the count of programmable monitoring period counter 12 reaches the user-programmed upper bound, it preferably asserts a signal at 122, which is output to both bit error counter 11 and error flag generator 13, which use signal 122 as described below.

Error flag generator 13 preferably includes comparator(s) 130 and a user-programmable memory 131 into which a user, via input 132, can enter an error threshold value. The value in user-programmable memory 131 is one input to the comparator, while error count signal 15 is the other input to the comparator. Signal 122 is used as an enable signal for the comparator.

When the monitoring period duration is reached, monitoring period counter 12 briefly asserts signal 122, which enables the comparator(s) in error flag generator 13. If, while a comparator 130 is enabled, the error count 15 exceeds the threshold value in memory 131, then error flag generator 13 asserts an error flag 133. Signal 122 also functions as a reset signal for bit error counter 11, so that the error count returns to zero for the start of a new monitoring period.

Error flag generator 13 preferably provides not only basic error flag 133, but preferably also 1,000-times-error flag 134 and 1,000,000-times-error flag 135. Thus, if the basic error flag 133 represents one error per billion bits, then 1,000-times-error flag 134 represents one error in one million bits and 1,000,000-times-error flag 135 represents one error in one thousand bits. As stated above, these flags 133-135 are actually multiples of 1,024 rather than multiples of 1,000, so that 1,000-times-error flag 134 is actually 1,024 times less sensitive than error flag 133, while 1,000,000-times-error flag 135 is actual $1,024^2$ times (or 1,048,576 times) less sensitive than error flag 133.

Flag selector 136, which preferably is a multiplexer as shown, is programmable by user input 137 to select one of the three flags 133, 134, 135 as the output 138 of error flag generator 13.

It is possible that error flag generator 13 makes three separate comparisons to generate flags 133-135. In one embodiment of such a case, the user might program three separate thresholds in memory or memories 131, and a separate comparison would be made between error count signal 15 and each threshold. However, preferably 1,000-times-error flag 134 and 1,000,000-times-error flag 135 are extrapolated from base error flag 133. One way that this can be done is shown in FIGS. 2-4.

Figure 2:
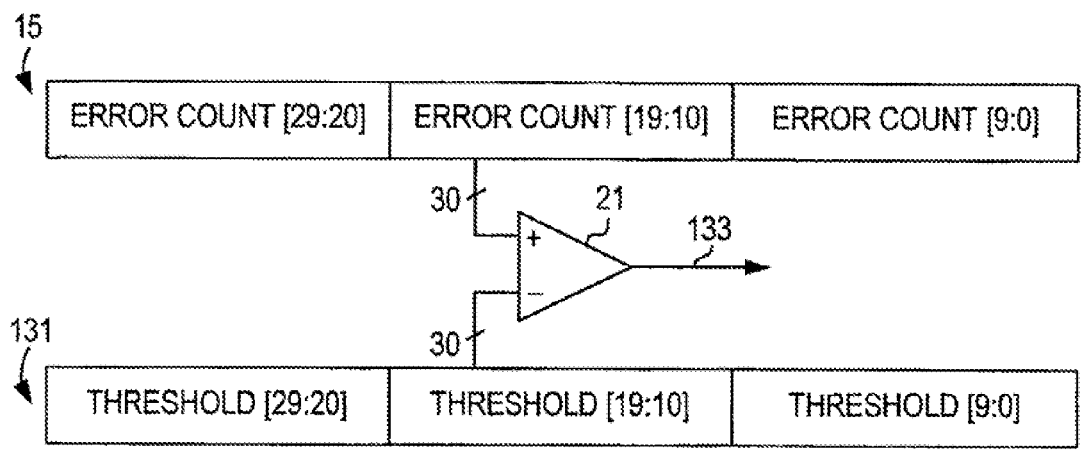
FIG. 2 is a diagram showing generation of a base error flag in accordance with a preferred embodiment of the present invention.
Figure 3:
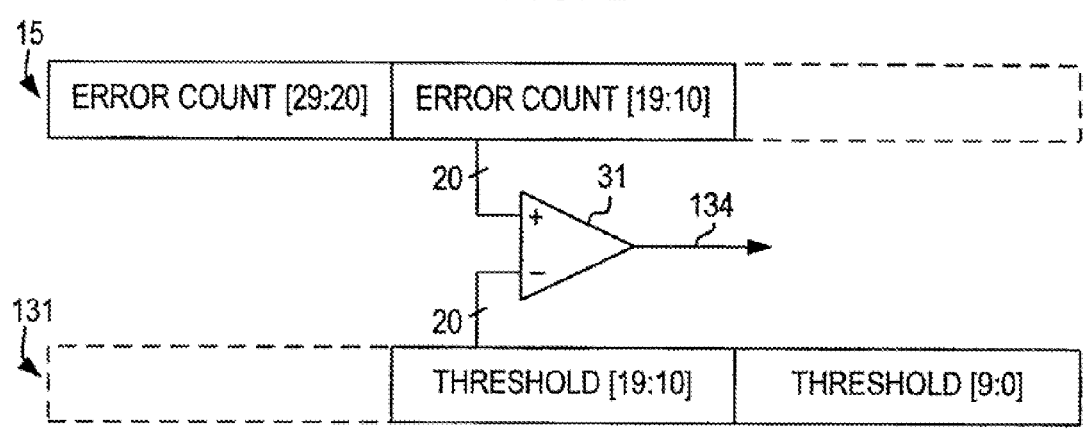
FIG. 3 is a diagram showing generation of a higher threshold error flag than in FIG. 2 in accordance with a preferred embodiment of the present invention.
Figure 4:
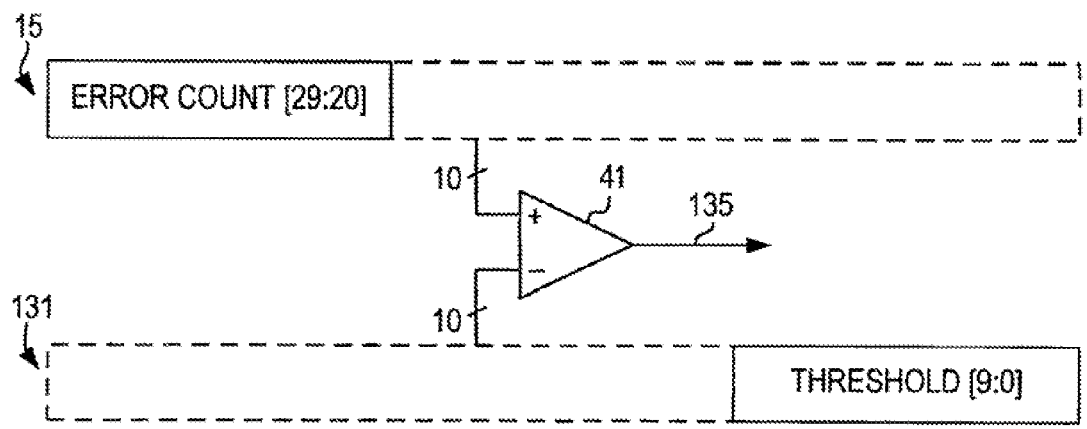
FIG. 4 is a diagram showing generation of a still higher threshold error flag than in FIG. 3 in accordance with a preferred embodiment of the present invention.

As seen in FIGS. 2-4, error count signal 15 as generated by bit error counter 11 preferably is a 30-bit number. This is required for the preferred one-in-a-billion resolution of base error flag 133. $2^{30} \approx 1.07 \times 10^{-9}$, and is the smallest power of 2 to exceed one billion, and therefore thirty bits preferably are used. For the base comparison shown in FIG. 2, which generates error flag 133, comparator 21 compares error count 15 directly to threshold memory 131, which also may be a 30-bit number. If error count 15 exceeds threshold 131, error flag 133 preferably is asserted.

For the 1,000-times comparison shown in FIG. 3, which generates error flag 134, comparator 31 compares only the twenty most significant bits of error count 15 to only the twenty least significant bits of threshold memory 131. This results in an approximation of 1,000 times less sensitivity than base error flag 133. If the twenty most significant bits of error count 15 exceed the twenty least significant bits of threshold 131, error flag 134 preferably is asserted.

For the 1,000,000-times comparison shown in FIG. 4, which generates error flag 135, comparator 41 compares only the ten most significant bits of error count 15 to only the ten least significant bits of threshold memory 131. This results in an approximation of 1,000,000 times less sensitivity than base error flag 133. If the ten most significant bits of error count 15 exceed the ten least significant bits of threshold 131, error flag 135 preferably is asserted.

It follows from the foregoing that in most cases, a 10-bit error threshold is sufficient, considering that for flags 134 and 135, the ten or twenty most significant bits of the number in threshold memory 131 are ignored. Indeed, in a preferred embodiment, if a user programs a threshold value into threshold memory 131 that has any ones in the twenty most significant bits then flag 135 is not available, and if any of those ones are in the ten most significant bits then flag 134 also is not available.

The discussion so far has assumed a monitoring period on the order of one second. However, greater error resolution can be obtained by lengthening the monitoring period. A factor of ten increase in the duration of monitoring period results in substantially a factor of ten increase in resolution. Therefore, by lengthening the monitoring period sufficiently, the bit error rate can be measured with a resolution of $10^{-18}$ to $10^{-15}$, which is in the range of error rates for many telecommunications applications.

The present invention provides users with the flexibility to adjust a bit error rate monitor to accommodate any deviations in their designs from known standards as described above by allowing easy adjustment of the monitoring period and the error threshold, as well as the easy selection of error flags or different sensitivities. Thus, the hypothetical user described above who implements an 11 Gb/s interface can easily adapt bit error rate monitor 10 to accommodate that interface.

Figure 5:
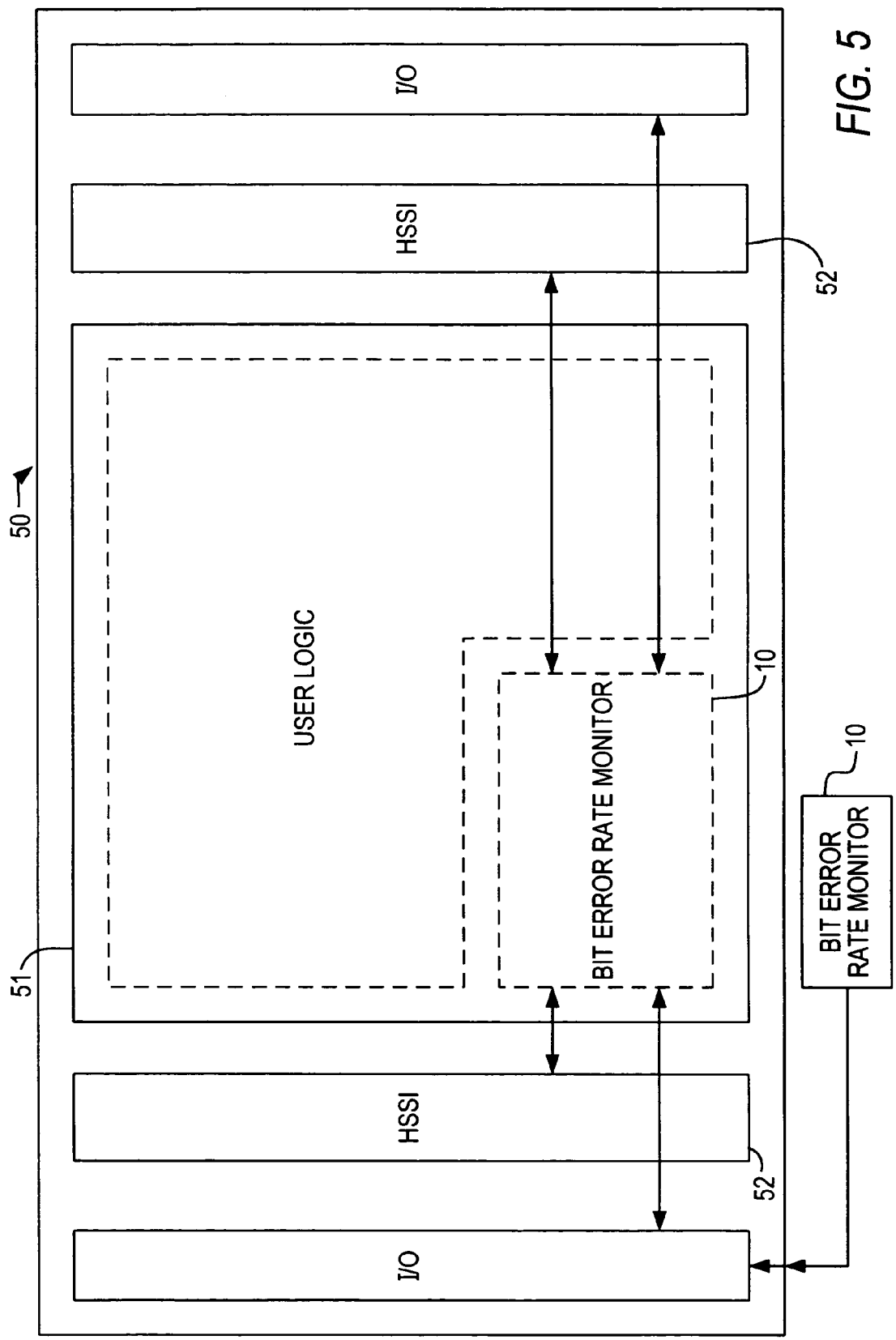
FIG. 5 is a schematic representation of a programmable logic device incorporating a bit error rate monitor in accordance with the present invention.

As stated above, bit error rate monitor 10 according to the present invention may be implemented in a dedicated circuit having programmable memories for monitoring period upper bound memory 120 and threshold memory 131. Alternatively, bit error rate monitor 10 could be implemented in a programmable logic device. Either way, as seen in FIG. 5, bit error rate monitor 10 may be used with another PLD 50 including a programmable logic region 51 and a high-speed serial interface 52 to monitor error rates in high-speed serial interface 52. If PLD 50 is sufficiently large, bit error rate monitor 10 could be implemented using part of the programmable logic resources in programmable logic region 51, as shown. In such a case, the user could devise the necessary programming independently, or could rely on a preprogrammed logic "core" available from the provider of PLD 50 or from a third party. FIG. 5 shows bit error rate monitor 10 both as an internal device implemented in programmable logic 51, and as an external device implemented either as a dedicated circuit or in another PLD, but normally in any particular implementation only one of those options will be used for bit error rate monitor 10.

Figure 6:
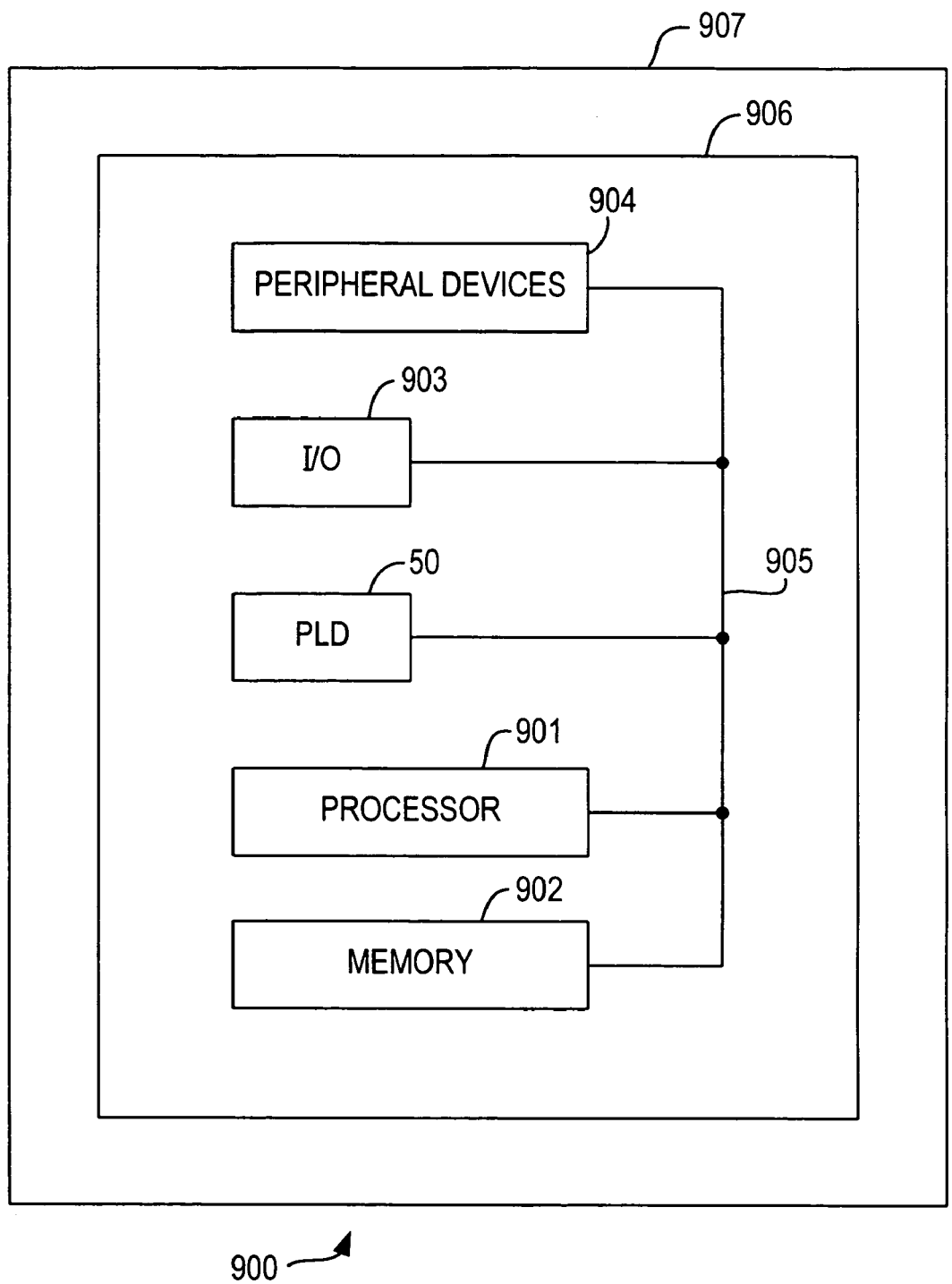
FIG. 6 is a simplified block diagram of an illustrative system employing a programmable logic device incorporating a bit error rate monitor in accordance with the present invention.

PLD 50 with which, or in which, bit error rate monitor 10 according to the present invention may be used, preferably is programmably configurable to handle any of a plurality of high-speed communication protocols. A PLD 50 incorporating a bit error rate monitor according to the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 50 can be used to perform a variety of different logic functions. For example, PLD 50 can be configured as a processor or controller that works in cooperation with processor 901. PLD 50 may also be used as an arbiter for arbitrating access to a shared resources in system 900. In yet another example, PLD 50 can be configured as an interface between processor 901 and one of the other components in system 900. It should be noted that system 900 is only exemplary, and that the true scope and spirit of the invention should be indicated by the following claims.

Various technologies can be used to implement PLDs 50 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

The invention claimed is:

1. A programmable bit error rate monitor for a serial data interface, said monitor comprising:
    a bit error counter adapted to receive a serial data stream and to output a count of errors in said serial data stream;
    a monitoring period counter adapted to receive (a) a clock associated with said serial data stream and (b) user input of a monitoring period duration, and to generate a monitoring period detection signal upon passage of said monitoring period duration; and
    an error flag generator adapted to receive (1) user input of an error threshold, (2) said monitoring period detection signal, and (3) said count of errors from said bit error counter, and to output, in parallel, a plurality of error flags at different error resolutions, including a base error flag, when, within any said monitoring period duration, said count of errors exceeds said error threshold.

2. The programmable bit error rate monitor of claim 1 wherein said monitoring period detection signal is output to said bit error counter as a reset signal for said bit error counter.

3. The programmable bit error rate monitor of claim 1 further comprising a multiplexer having as inputs (a) said plurality of error flags and (b) a user signal selecting one of said plurality of error flags.

4. The programmable bit error rate monitor of claim 1 wherein said plurality of error flags comprises said base error flag and at least one additional error flag extrapolated from said base error flag.

5. The programmable bit error rate monitor of claim 4 wherein said error flag generator extrapolates said at least one additional error flag by comparing a range of bits of said count of errors of a predetermined significance to a range of bits of said threshold of said predetermined significance.

6. The programmable bit error rate monitor of claim 5 wherein:
    said error flag generator generates said base error flag and first and second additional error flags;
    said error flag generator generates said base error flag by comparing all bits of said count of errors to all bits of said threshold;
    said error flag generator generates said first additional error flag by comparing all but a group of least significant bits of said count of errors to all but a group of most significant bits of said threshold; and
    said error flag generator generates said first second additional error flag by comparing only a group of most significant bits of said count of errors to only a group of least significant bits of said threshold.

7. The programmable bit error rate monitor of claim 4 wherein:
    said error flag generator generates said base error flag and first and second additional error flags.

8. The programmable bit error rate monitor of claim 1 wherein:
    said error flag generator generates said base error flag and first and second additional error flags.

9. A programmable logic device comprising a programmable bit error rate monitor according to claim 1.

10. A digital processing system comprising:
    processing circuitry;
    a memory coupled to said processing circuitry; and
    a programmable logic device as defined in claim 9 coupled to the processing circuitry and the memory.

11. A printed circuit board on which is mounted a programmable logic device as defined in claim 9.

12. The printed circuit board defined in claim 11 further comprising:
    memory circuitry mounted on the printed circuit board and coupled to the programmable logic device.

13. The printed circuit board defined in claim 12 further comprising:
    processing circuitry mounted on the printed circuit board and coupled to the memory circuitry.

* * * * *